US011025424B2

(12) United States Patent
Medvinsky et al.

(10) Patent No.: US 11,025,424 B2
(45) Date of Patent: Jun. 1, 2021

(54) ENTITLEMENT MANAGEMENT MESSAGE EPOCH AS AN EXTERNAL TRUSTED TIME SOURCE

(71) Applicant: ARRIS Enterprises LLC, Suwanee, GA (US)

(72) Inventors: Alexander Medvinsky, San Diego, CA (US); Douglas M. Petty, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 223 days.

(21) Appl. No.: 16/396,601

(22) Filed: Apr. 26, 2019

(65) Prior Publication Data

US 2020/0266983 A1 Aug. 20, 2020

Related U.S. Application Data

(60) Provisional application No. 62/807,287, filed on Feb. 19, 2019.

(51) Int. Cl.
*H04L 9/08* (2006.01)
*H04L 9/32* (2006.01)

(52) U.S. Cl.
CPC .......... *H04L 9/0897* (2013.01); *H04L 9/0891* (2013.01); *H04L 9/3297* (2013.01)

(58) Field of Classification Search
CPC ........ G06F 21/10; G06F 21/126; G06F 21/57; G06F 21/725; G06F 2221/0753; G06F 2221/0755; H04L 9/0891; H04L 9/0897; H04L 9/3297; H04N 21/26606; H04N 21/4302; H04N 21/4623; H04N 21/6543
See application file for complete search history.

(56) References Cited

U.S. PATENT DOCUMENTS

| | | | | |
|---|---|---|---|---|
| 7,076,661 | B2* | 7/2006 | Chen | H04N 7/165 348/E7.056 |
| 7,257,227 | B2* | 8/2007 | Chen | H04N 7/165 348/E7.056 |
| 7,970,132 | B2* | 6/2011 | Fahrny | H04N 7/17309 380/42 |
| 2002/0076050 | A1* | 6/2002 | Chen | H04N 21/2543 380/231 |
| 2005/0157877 | A1* | 7/2005 | Chen | H04N 7/17336 380/228 |
| 2005/0169468 | A1* | 8/2005 | Fahrny | H04N 21/4405 380/210 |

(Continued)

OTHER PUBLICATIONS

Search Query Report from IP.com (performed Jan. 28, 2021) (Year: 2021).*

*Primary Examiner* — Sharon S Lynch
(74) *Attorney, Agent, or Firm* — Chernoff, Vilhauer, McClung & Stenzel, LLP

(57) ABSTRACT

An external trusted time source is implemented over a network for conditional access system (CAS)/digital rights management (DRM) client devices. A client device includes untrusted software and a trusted execution environment (TEE) for processing an entitlement management message (EMM) that includes an epoch sequence number (ESN) transmitted from an EMM server using a first network connection. A remaining client key set (CKS) lifetime value is stored and updated in the TEE based on the ESN processed.

20 Claims, 15 Drawing Sheets

(56) References Cited

U.S. PATENT DOCUMENTS

| | | | |
|---|---|---|---|
| 2006/0137015 A1* | 6/2006 | Fahrny | H04N 21/235 |
| | | | 726/26 |
| 2006/0159264 A1* | 7/2006 | Chen | H04N 7/162 |
| | | | 380/231 |
| 2007/0242829 A1* | 10/2007 | Pedlow, Jr. | H04L 9/0822 |
| | | | 380/277 |
| 2010/0296655 A1* | 11/2010 | Solow | H04L 9/088 |
| | | | 380/279 |
| 2011/0228942 A1* | 9/2011 | Fahrny | H04N 7/17309 |
| | | | 380/278 |
| 2012/0201377 A1* | 8/2012 | Dellow | H04L 9/32 |
| | | | 380/44 |
| 2018/0279002 A1* | 9/2018 | Cugi | H04N 21/4627 |
| 2020/0137455 A1* | 4/2020 | Cugi | G06F 21/62 |

* cited by examiner

ENTITLEMENT MANAGEMENT MESSAGE EPOCH AS AN EXTERNAL TRUSTED TIME SOURCE

CROSS REFERENCE TO RELATED APPLICATION

This application claims priority under 35 U.S.C. § 119(e) from earlier filed U.S. Provisional Application Ser. No. 62/807,287, filed Feb. 19, 2019 which is incorporated herein by reference.

BACKGROUND

Technical Field

The subject matter of the present disclosure relates generally to the protection of an external secure time source when verifying limited lifetimes of CAS or DRM client keys over a network using a trusted execution environment.

Related Art

Conditional access systems (CAS) or Digital Rights Management (DRM) use a trusted execution environment such as an Intel® SGX Enclave to protect client key sets and other secure data across platform reboots. These client keys in some cases have a limited lifetime and need to expire after some number of months or years after first being installed on a client system. A secure and trusted time source is helpful in this situation. There are additional needs for a secure time implemented inside trusted execution environments such as an Intel® SGX Enclave, such as the enclave software may need to be periodically validated by an Attestation Server, to verify the software includes the latest security patches.

Thus, it would be advantageous and an improvement over the relevant technology to provide an apparatus and/or a method that is capable of protecting an external secure time source that cannot be manipulated when verifying limited lifetimes of CAS or DRM client keys and software versions over a network using a trusted execution environment such as an Intel® SGX Enclave in a network.

SUMMARY

Embodiments described in the present disclosure provide methods to implement an entitlement management message epoch as an external trusted time source over a network to a conditional access system (CAS) client device. The methods include transmitting an entitlement management message (EMM) to a trusted execution environment (TEE) within a client device from an EMM server using a first network connection, the EMM including an epoch sequence number (ESN); generating an updated remaining client key set (CKS) lifetime value in the TEE based on an initial lifetime duration value for the CKS, and the ESN value in the EMM; sealing the CKS, updated ESN value in the EMM, and updated remaining CKS lifetime value as unit information; and delivering the updated remaining CKS lifetime value and updated ESN value in the EMM from the TEE to untrusted software in the CAS client device, and storing the updated remaining CKS lifetime value and updated ESN value.

Embodiments described in the present disclosure provide an apparatus to implement the external trusted time source over a network for a CAS client device. The apparatus includes a non-transitory memory configured to store one or more programs, untrusted software, and a trusted execution environment (TEE); a hardware processor configured to execute the one or more programs to perform operations of the untrusted software and the TEE; and a network interface configured to establish communication with a network using a network connection, wherein when the one or more programs are executed by the hardware processor: the TEE of the CAS client device receives an entitlement management message (EMM) from an EMM server using the network connection, wherein the EMM includes an epoch sequence number (ESN), the TEE generates an updated remaining client key set (CKS) lifetime value based on an initial lifetime duration value for the CKS, and the ESN value in the EMM, the TEE seals the CKS, updated ESN value in the EMM, and updated remaining CKS lifetime value as unit information, and the TEE delivers the updated remaining CKS lifetime value to untrusted software in the CAS client server, and stores the updated remaining CKS lifetime value.

Embodiments described in the present disclosure provide a non-transitory computer-readable recording medium in each of the client device and the EMM server for implementing an entitlement management message epoch as an external trusted time source over a network to a CAS client device. Each non-transitory computer-readable recording medium stores one or more programs which when executed by a respective processor performs the steps of the method described above.

BRIEF DESCRIPTION OF THE DRAWINGS

In the drawings, like reference numbers generally indicate identical, functionally similar, and/or structurally similar elements.

DETAILED DESCRIPTION

Figure 1:
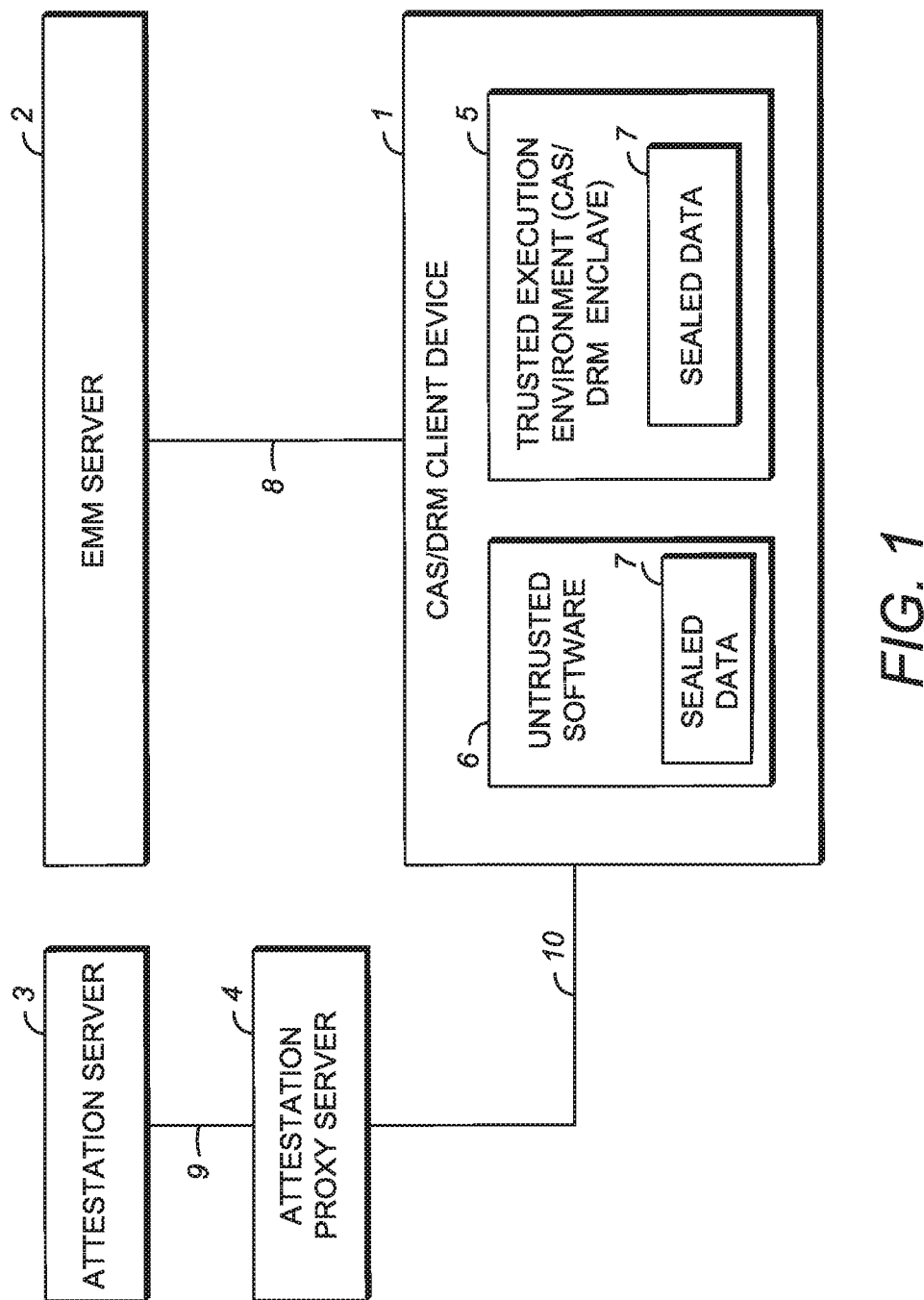
FIG. 1 is a schematic diagram of a system for implementing an entitlement management message epoch as an external trusted time source according to an embodiment of the present disclosure.
Figure 2:
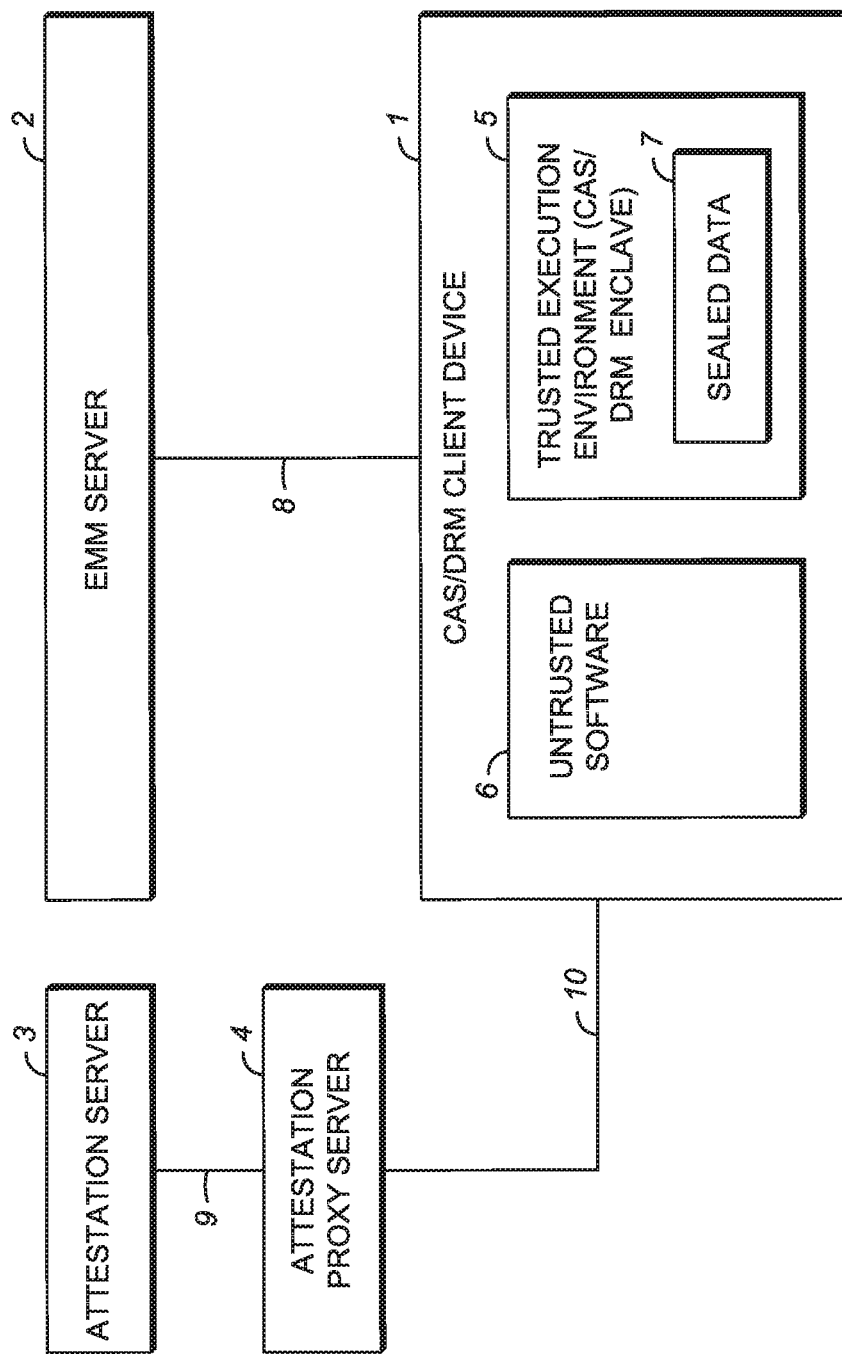
FIG. 2 is a schematic diagram of a system for implementing an entitlement management message epoch as an external trusted time source according to an embodiment of the present disclosure.

FIG. 1 is a schematic diagram of a system for implementing an entitlement management message epoch as an external trusted time source. As shown in FIG. 1, the system includes a conditional access system/digital rights management (CAS) client device 1, an attestation proxy server (APS) 4, an attestation server 3, and an entitlement management message (EMM) server 2. The CASDRM client device may be referenced as a CAS client device, however, DRM client devices can also be used in these environments. FIG. 2 is also a schematic diagram of the same system for implementing an entitlement management message epoch as an external trusted time source. References to FIG. 1 throughout the disclosure also reflect the system in FIG. 2 with the exception of where sealed data 7 is stored. Discussions of sealed data 7 will distinguish between FIG. 1 and FIG. 2, otherwise reference to FIG. 1 can reflect both the FIG. 1 and FIG. 2 system.

Figure 14:
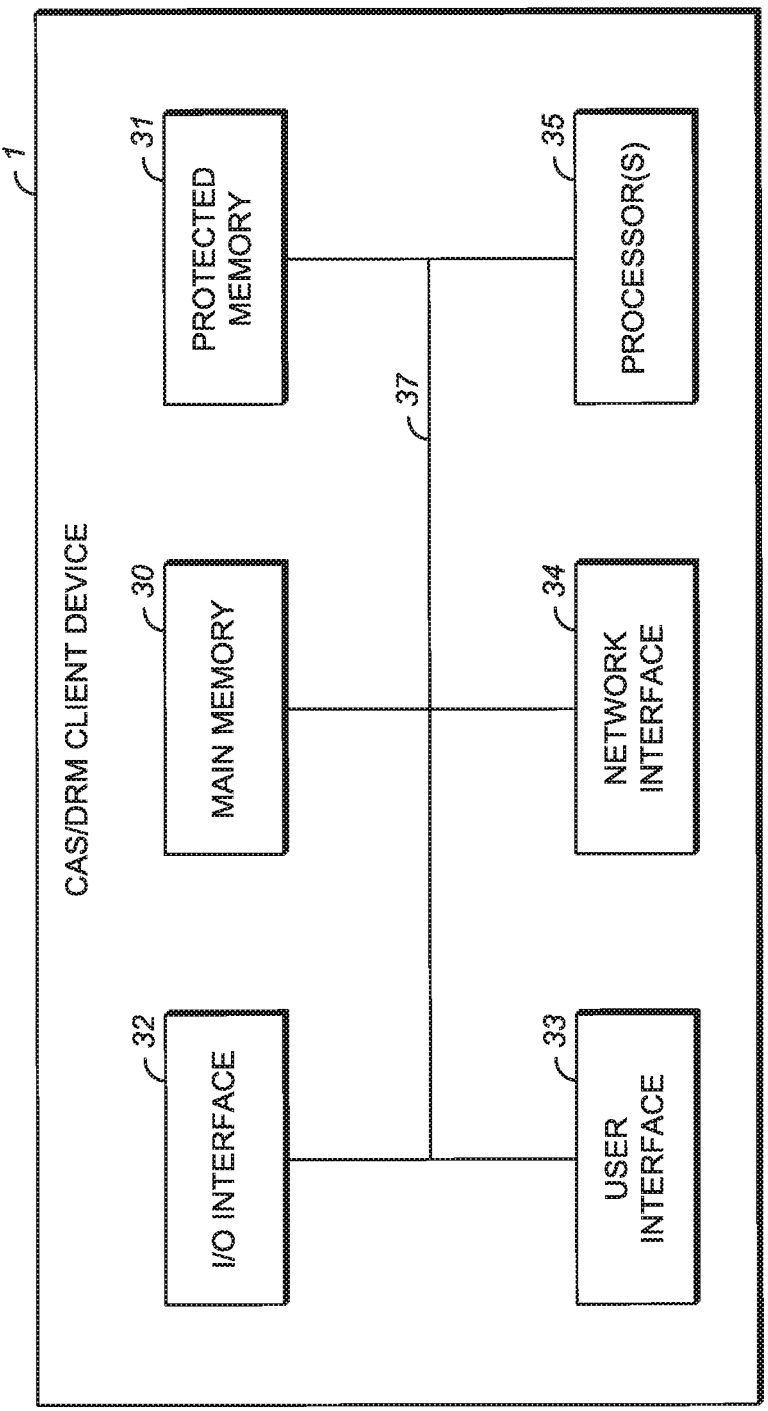
FIG. 14 is a schematic diagram of an exemplary client device according to an embodiment of the present disclosure.
Figure 15:
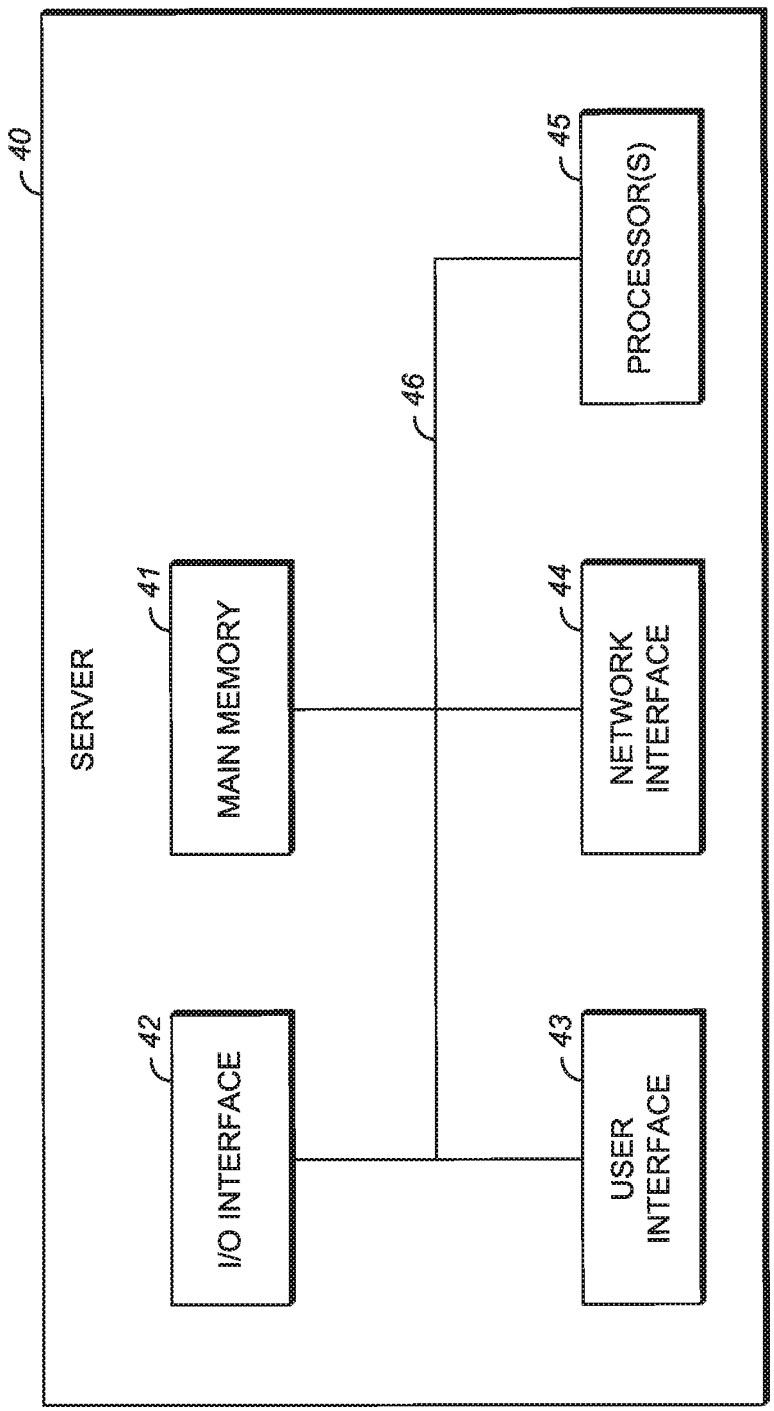
FIG. 15 is a schematic diagram of an exemplary server according to an embodiment of the present disclosure.

An explanation of exemplary internal components of the CAS client device 1 and servers 2, 3, 4 shown in FIG. 1 will be provided in the discussion of FIGS. 14 and 15. However, in general, it is contemplated by the present disclosure that the CAS client device 1 and servers 2, 3, 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing devices in the CAS client device 1 and the servers 2, 3, 4 may be adapted to execute any operating system, including Linux, UNIX, Windows Server, etc., as well as virtual machines adapted to virtualize execution of a particular operating system, including customized and proprietary operating systems. The CAS client device 1 and servers 2, 3, 4 are further equipped with components to facilitate communication with other computing devices over the one or more network connections 8, 9, 10. The network connections 8, 9, 10 include connections to local and wide area networks, wireless and wired networks, public and private networks, and any other communication network enabling communication in the system.

In FIG. 1, the CAS client device 1 is a personal computer, laptop, smartphone, tablet computer, personal digital assistant, set top box, in-vehicle computing systems, or other similar computing device. The CAS client device 1 includes one or more memories or memory locations for storing the software components, which include untrusted software 6 and a trusted execution environment (TEE) 5. The one or more memories in the CAS client device 1 include, but are not limited to, random access memory (RAM), dynamic random access memory (DRAM), read only memory (ROM), logic blocks of a field programmable gate array (FPGA), erasable programmable read only memory (EPROM), and electrically erasable programmable ROM (EEPROM).

The untrusted software 6 facilitates communication with the TEE 5 and other components of the CAS client device 1 as well as communication between the TEE 5 and the network servers 2, 3, 4. The untrusted software 6 can include sealed data 7, such as sealed unit information, that can be attached to a message or a request generated (e.g., updated unit information) to certify that it originated from the untrusted software 6 as shown in FIG. 2. The untrusted software 6 can be stored in non-volatile memory, RAM, or other similar memory in the CAS client device 1 maintained separate from the TEE 5.

The TEE 5 is, for example, an Intel® SGX Enclave stored in a special protected memory region such as a processor reserved memory of DRAM of the CAS client device 1. The TEE 5 is a protected environment for trusted execution that contains code and data pertaining to a security-sensitive computation. The TEE 5 protects the confidentiality and integrity of computations performed inside the TEE 5 from attacks by malicious computing devices and/or software. The TEE 5 can include sealed data 7, such as sealed unit information, that can be attached to a message or a request generated (e.g., updated unit information) to certify that it originated from the TEE 5. The sealed data 7 is further described below.

The CAS client device 1 can include a user interface such as a key board, mouse, touchscreen display, network connection between user and client, or the like to allow a user to view and interact with the applications, tools, services, and other software of the CAS client device 1. While only one CAS client device 1 is shown, the present disclosure contemplates that more than one CAS client device 1 can be implemented.

The untrusted software 6 establishes communications with the APS 4 using a network connection 10. It is contemplated by the present disclosure that communications between the TEE 5 or the untrusted software 6 of the CAS client device 1 and the APS 4 via the network connection 10 are authenticated using, for example, a server authenticated transport layer security (TLS) to secure all communications between the APS 4 and the CAS client device 1. The APS 4 is a network server that provides verification that a software version or data generated (e.g., an attestation check request) from the TEE 5 is the correct version or has not been modified after leaving the CAS client device 1.

The attestation server 3 is a network server providing attestation services such as those provided by an Intel® Attestation Service. The attestation server 3 communicates with the APS 4 using a network connection 9. It is contemplated by the present disclosure that communications between the APS 4 and the attestation server 3 via network connection 9 are authenticated using, for example, mutually authenticated TLS to secure all communications between the APS 4 and the attestation server 3. The attestation server 3 utilizes technology, such as the Intel EPID technology, to provide verification of the information provided from the CAS client device 1 via the APS 4. For example, the software of the CAS client device 1 can be verified by the attestation server 3 and the results returned to the attestation proxy 4 using the network connection 9.

The entitlement management message (EMM) server 2 is a network server that communicates with the CAS client device 1 using a network connection 8. It is contemplated by the present disclosure that communications between the CAS client device 1 and the EMM server 2 via network connection 8 are implemented using, for example, a transmission control protocol/Internet protocol (TCP/IP). As shown in FIG. 1, the EMM server 2 stores EMMs and sends EMMs. EMMs can be utilized by a CAS and DRM system to deliver both digital content authorizations and group keys to clients, when both content authorizations and group keys are required for a client to obtain access to a particular broadcast program or category of content.

Each EMM can include a sequential integer value called an epoch that is incremented by "M", where "M" is >=1, every time there is a change to a group key from the EMM server 2. The epoch is incremented by M on a periodic basis using a known interval (e.g. monthly). The EMM may include the epoch increment with a change in group keys, or the like. In order to track these increment transitions of the epoch and translate these transitions to a "time", the most recently seen epoch sequence number (ESN) is identified. The communication from the EMM server 2 may pass through the untrusted software 6. The EMM is encrypted and authenticated to ensure that the epoch has not been tampered.

The enclave platform, such as an Intel® SGX platform, allows for a secure file storage for saving secure data encrypted with a device-unique sealing key across platform reboots. Once sealed, the secured data, referred to as sealed data 7, can be saved in any storage, including unprotected storage in the untrusted software 6. FIG. 1 and FIG. 2 illustrate locations where the sealed data 7 can be stored, i.e. in either the untrusted software 6 and a copy in the TEE 5 in FIG. 1 or the TEE 5 in FIG. 2. In certain embodiments, the sealed data 7 can be persistently stored in the untrusted software 6 in an encrypted form and then copied into the TEE 5 and decrypted there when the sealed data 7 is used. Additionally, the sealed data 7 can be only in the TEE 5 in a persistent memory such as in a secure flash. Further, the sealed data 7 can be persistently stored in the untrusted software 6. The act of sealing or encrypting this data can only be preformed within the TEE 5, the only place where the sealing key is accessible. Likewise, decrypting the sealing data 7 and being able to read the clear values within it can only be accomplished by the TEE 5 because it has access to the sealing key used for decryption. The sealed data 7 is used to persistently store a client key set (CKS). To track time elapsed, the most recently seen ESN and remaining CKS lifetime values also need to be placed in the sealed data 7.

Figure 3:
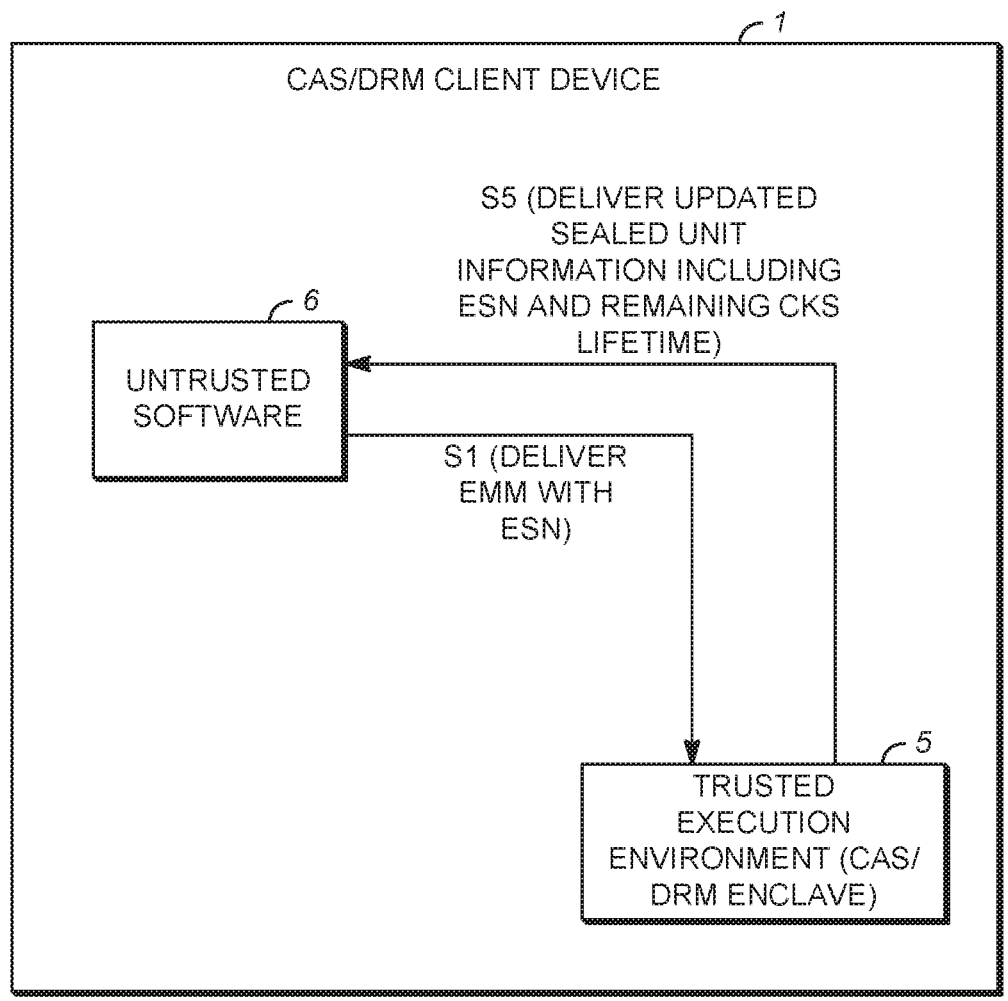
FIG. 3 illustrates a method for initializing the entitlement management message epoch as an external trusted time source using the system of FIG. 1 or FIG. 2 according to an embodiment of the present disclosure.

FIG. 3 illustrates a method for implementing the entitlement management message epoch as an external trusted time source using the system of FIG. 1.

In step S1, the EMM is delivered to the TEE 5 of the CAS client device 1. In certain embodiments, the EMM is transmitted through the untrusted software 6. The EMM includes the current ESN.

Figure 4:
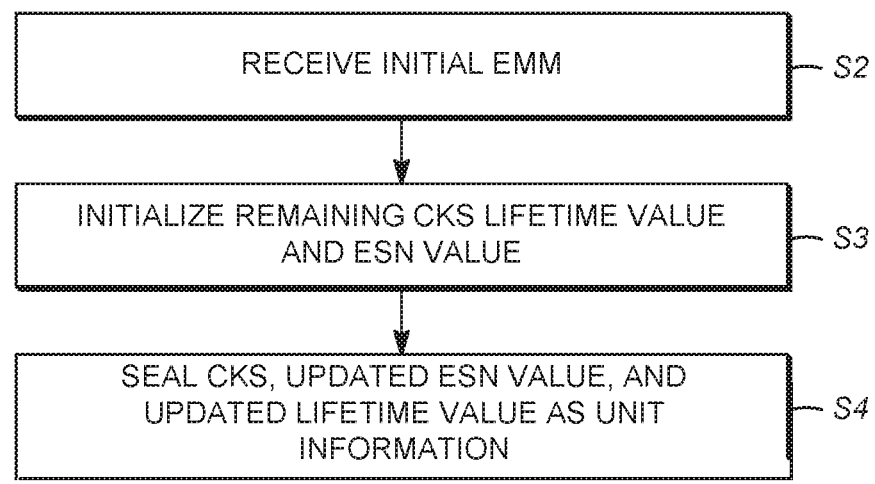
FIG. 4 illustrates a portion of the method performed by the trusted execution environment for processing the epoch from the initial entitlement management message according to an embodiment of the present disclosure shown in FIG. 3.

Steps S2 through S4, shown in FIG. 4, include the receiving of the initial EMM in the TEE 5 in step S2. If the EMM has been tampered with, the TEE 5 can detect and in some embodiments, an alarm may be initiated. During an initial receipt of the EMM, which is after obtaining the CKS, the TEE 5 initializes remaining CKS lifetime value and the ESN value by identifying an initial lifetime duration of a CKS in step S3. The initial lifetime duration of a CKS can be a hardcoded default value, or provisioned with each CKS. In other words, the initial lifetime duration of a CKS can be delivered to each device as part of CKS or the initial lifetime duration of a CKS is a pre-configured value that is part of a CAS client implementation. The initial lifetime duration of a CKS may be ignored after the initializing of the remaining CKS lifetime value. In some embodiments, the initial lifetime duration of a CKS can be optionally stored and/or sealed. Step S4 has the TEE 5 sealing the field values from the EMM (ESN and remaining CKS lifetime value) in addition to the CKS, initial lifetime duration value (optionally) as unit information in the sealed data 7. A lower bound is identified for the remaining CKS lifetime value. In step S, the TEE 5 delivers the updated sealed unit information including the most recently seen ESN and the remaining CKS lifetime values to the untrusted software 6 in FIG. 3. As mentioned above, if it is an initial EMM transmission as is represented in FIGS. 3 and 4, then these values are initialized within the TEE 5 using the ESN from the initial EMM. If this is not an initial EMM transmission, then the values are updated based on the EMM received as will be discussed below. In the case of a reboot, the TEE does not accept the sealed unit information unless it also contains an EMM related remaining CKS lifetime value and ESN value. Additionally, the updated sealed unit information can be stored in the untrusted software for the client reboot.

Figure 5:
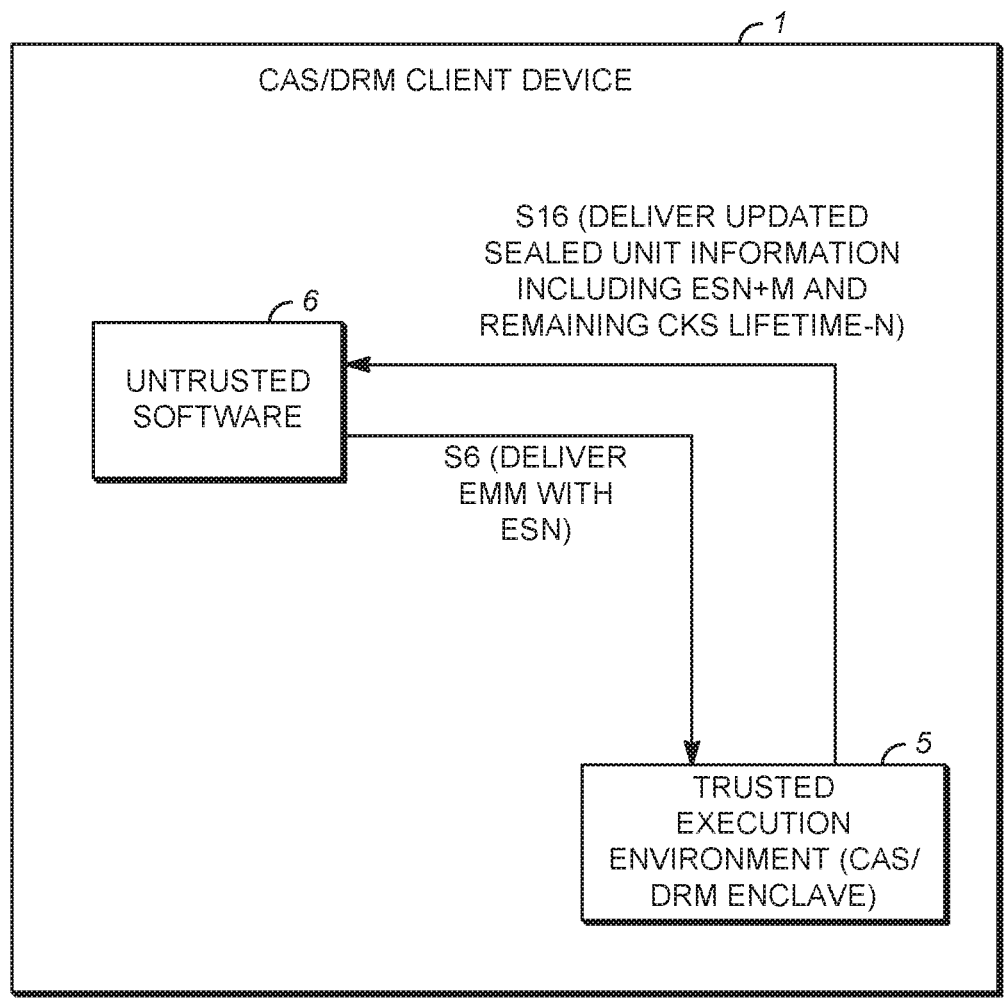
FIG. 5 illustrates a method for implementing the entitlement management message epoch during ongoing transmission of EMMs as an external trusted time source using the system of FIG. 1 or FIG. 2 according to an embodiment of the present disclosure.
Figure 6:
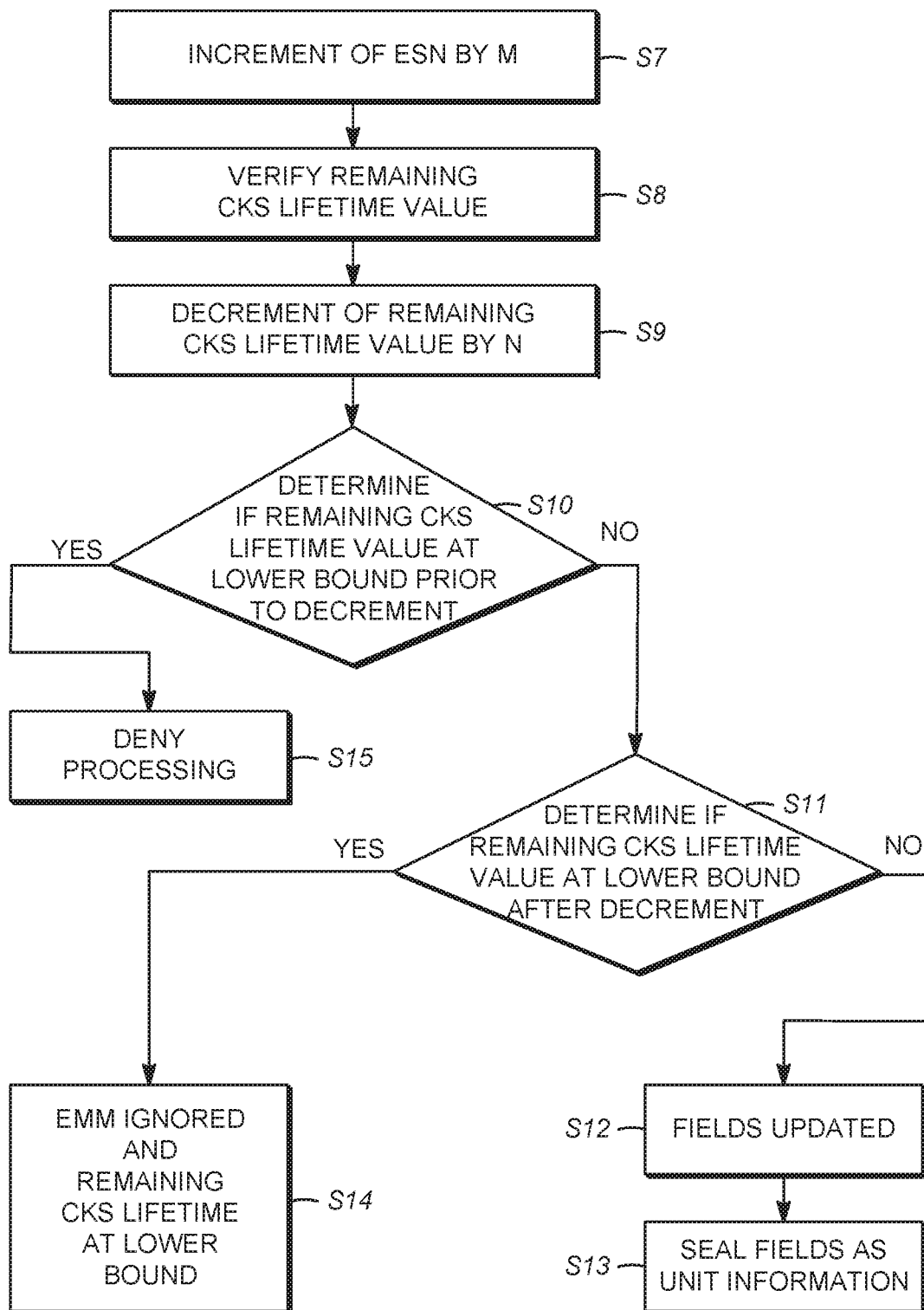
FIG. 6 illustrates a portion of the method performed by the trusted execution environment for processing the entitlement management message epoch according to an embodiment of the present disclosure shown in FIG. 5.

FIG. 5 illustrates a method for implementing the entitlement management message epoch as an external trusted time source using the system of FIG. 1 and FIG. 2. FIG. 3 refers to a first transmission of the EMM to the CAS client device 1 after the CKS is obtained. FIGS. 5 and 6 refer to an ongoing transmission of the EMM.

Over a specific amount of time that is a pre-defined epoch period, the EMM server moves to a next epoch transition. During this epoch transition, the ESN in the EMM is incremented by a value of M. In FIG. 5, step S6, the EMM is delivered to the TEE 5 of the CAS client device 1. FIG. 6 shows steps S7-S15 which include the process through the TEE 5. In step S7, when the TEE 5 receives the EMM, the TEE 5 increments the ESN by M, matching the ESN increment in the received EMM. In step S8, the TEE 5 verifies the remaining CKS lifetime value and decrements the remaining CKS lifetime value by N in step S9. The remaining CKS lifetime value may be at the lower bound prior to the processing of the EMM and decrement of the remaining CKS lifetime value. In step S10, it is determined if the remaining CKS lifetime value is already at a lower bound value. If the remaining CKS lifetime value is already at the lower bound value, then the EMM is not processed in step S15. In step S11, it is determined if the remaining CKS lifetime value is at the lower bound value after the remaining CKS lifetime value decremented. If the remaining CKS lifetime is at the lower bound value after decrement, then EMM is deleted or ignored and the sealed unit information is sent with the remaining CKS lifetime value at the lower bound in step S14. Step S12 illustrates if the remaining CKS lifetime value is not at the lower bound, the fields (ESN and remaining CKS lifetime values) are updated. The sealed updated fields are added to the unit information in step S13. FIG. 5 shows step S16 where the TEE delivers the updated sealed unit information including the ESN+M value and the remaining CKS lifetime value-N.

The ESN has a finite limit and after the ESN reaches its maximum value of Max-ESN, the next time it is incremented, the ESN wraps around to a value of 0. Therefore, in the cases when the ESN value inside a received EMM (EMM-ESN) is less than the currently saved ESN value (sealed-ESN), that implies that the ESN in the latest EMM generated by the EMM server 2 has wrapped around. In these cases, the value of M is calculated as follows: M=(Max-ESN−sealed-ESN+1)+EMM-ESN. Additionally, N is determined based on the above relationship between M and N.

Figure 7:
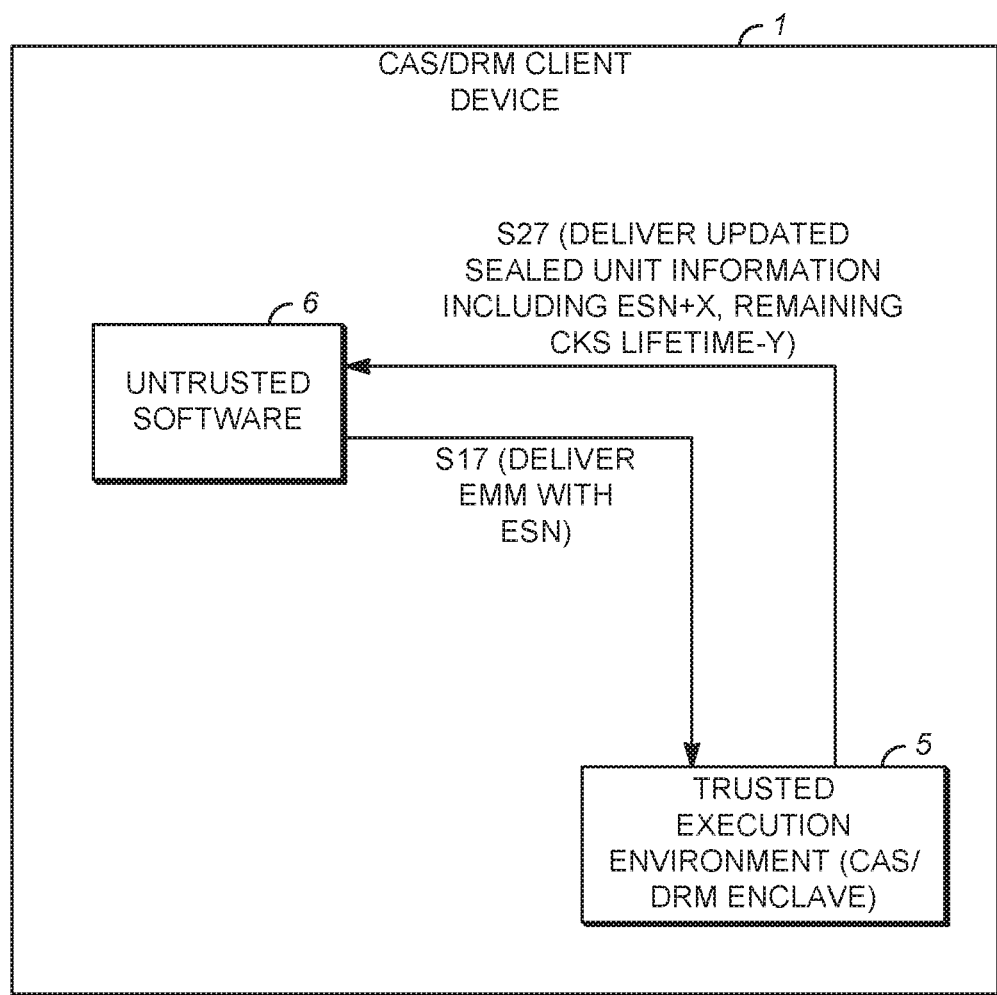
FIG. 7 illustrates a method for implementing the entitlement management message epoch as an external trusted time source when a large change in the ESN value occurs using the system of FIG. 1 or FIG. 2 according to an embodiment of the present disclosure.

FIG. 7 illustrates a method for implementing the entitlement management message epoch as an external trusted time source using the system of FIG. 1 and FIG. 2. FIG. 7 illustrates a situation where there may have been a large change in the ESN value between the ESN in a new EMM and the ESN that is stored by the TEE 5 from the last EMM processed. These situations can occur when the CAS client device 1 has been powered down for months and has not received any EMMs during that timeframe. Another situation where there may be a large change in the ESN values is when the CAS client device 1 has been moved, for example, to support a different CAS security domain. Additionally, another situation with a large jump in the ESN is where a hacker deliberately saves and then restores an old copy of the sealed unit information, in an attempt to set the clock backwards and re-use the same CKS for a longer period of time.

Figure 8:
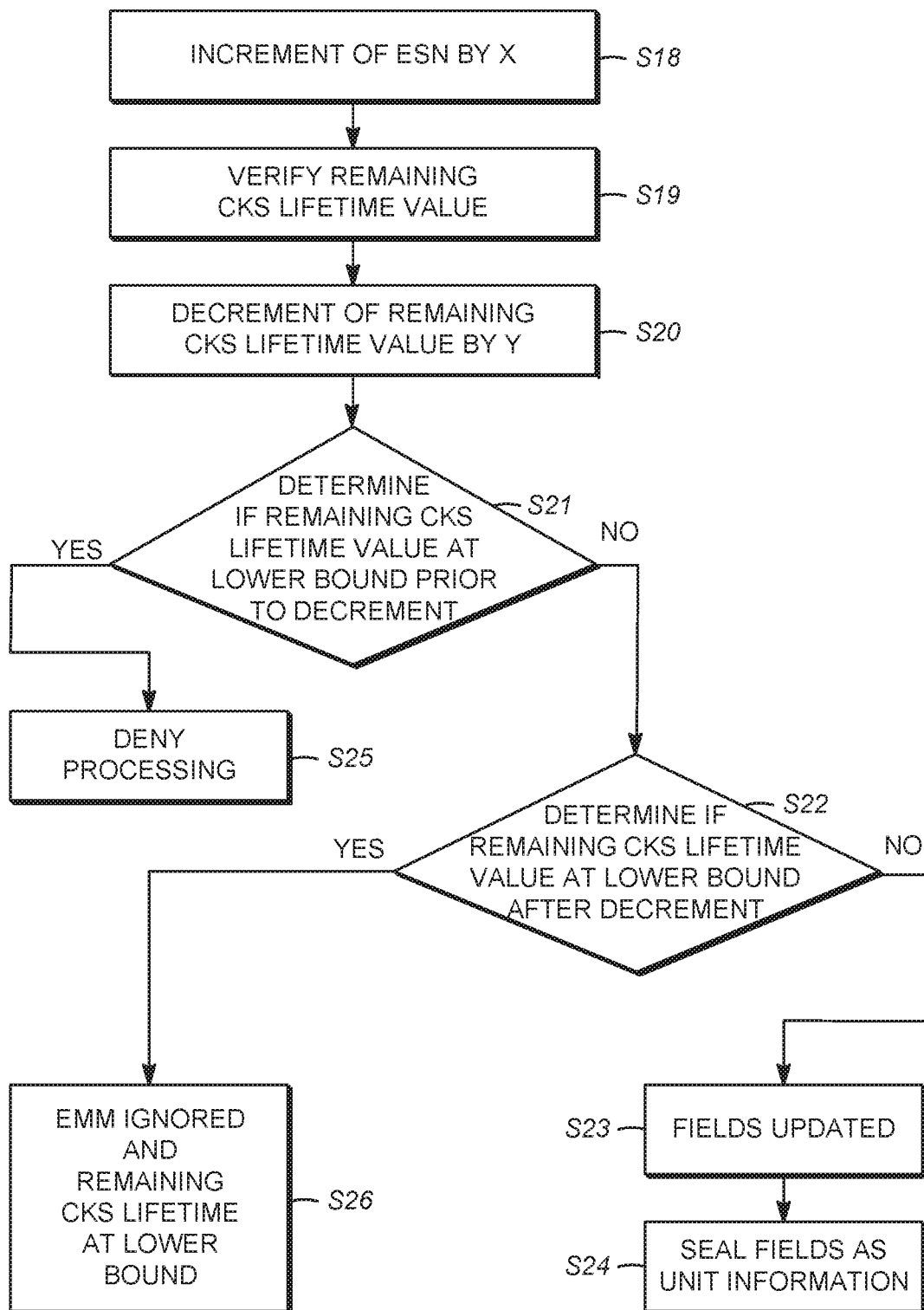
FIG. 8 illustrates a portion of the method performed by the trusted execution environment for processing the entitlement management message epoch according to an embodiment of the present disclosure shown in FIG. 7.

With the delivery of the EMM in step S17, the TEE 5 has to evaluate the ESN in the EMM. FIG. 8 illustrates where the TEE 5 detects a change in the ESN and identifies an increment of X in step S18. In step S19, the TEE 5 verifies the remaining CKS lifetime value. The TEE 5 then, based on the increments of ESN by X, decrements the remaining CKS lifetime value by a value Y in step S20. The value X is a multiple of M and the value Y is the same multiple of N, e.g. X=i*M and Y=i*N where X, Y, I, M, N are all positive integers.

As mentioned above, the ESN has a finite limit and after the ESN reaches its maximum value of Max-ESN, the next time it is incremented, the ESN wraps around to a value of 0. Therefore, in the cases when the ESN value inside a received EMM (EMM-ESN) is less than the currently saved ESN value (sealed-ESN), that implies that the ESN in the latest EMM generated by the EMM server 2 has wrapped around. In these cases, the value of X is calculated as follows: X=(Max-ESN−sealed-ESN+1)+EMM-ESN. Additionally, Y is determined based on the above relationship between X and Y.

The remaining CKS lifetime value may be at the lower bound prior to the processing of the EMM and decrement of the remaining CKS lifetime value. In step S21, it is determined if the remaining CKS lifetime value is already at a lower bound value. If the remaining CKS lifetime value is already at the lower bound value, then the EMM is not processed in step S25. In step S22, it is determined if the remaining CKS lifetime value is at the lower bound value after the remaining CKS lifetime value decremented. If the remaining CKS lifetime is at the lower bound value after the decrement, then EMM is deleted or ignored and the sealed unit information is sent with the remaining CKS lifetime value at the lower bound in step S26. Step S23 illustrates if the remaining CKS lifetime value is not at the lower bound, the fields (ESN and remaining CKS lifetime values) are updated. The sealed updated fields are added to the unit information in step S24. FIG. 7 shows step S27 where the TEE delivers the updated sealed unit information including the ESN+X value and the remaining CKS lifetime value-Y.

Figure 9:
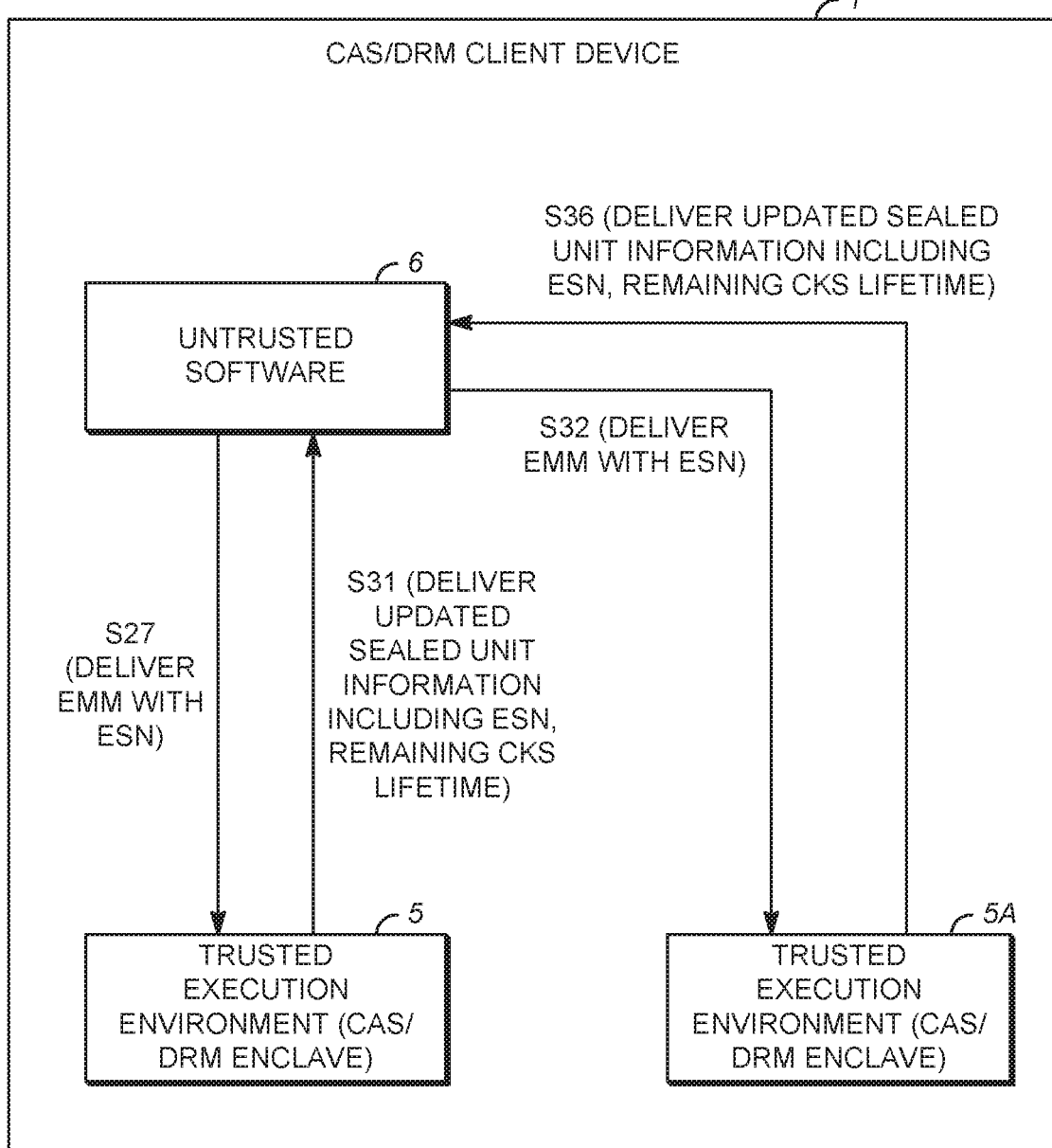
FIG. 9 illustrates a method for implementing the entitlement management message epoch as an external trusted time source with multiple TEE instances using the system of FIG. 1 or FIG. 2 according to an embodiment of the present disclosure.
Figure 10A:
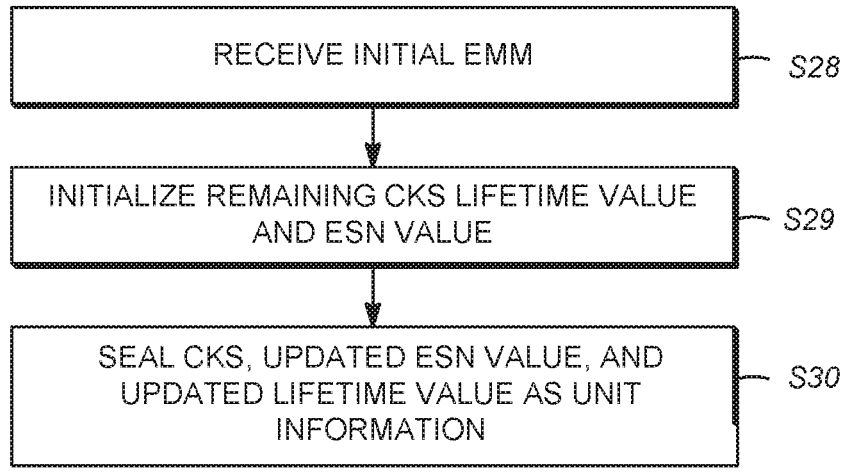
FIG. 10A illustrates a portion of the method performed by the trusted execution environment for processing the entitlement management message epoch according to an embodiment of the present disclosure shown in FIG. 9.
Figure 10B:
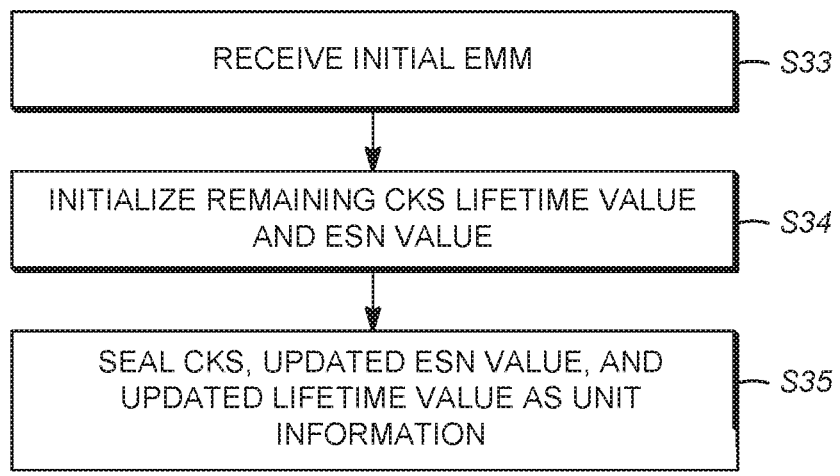
FIG. 10B illustrates a portion of the method performed by a second trusted execution environment for processing a separate entitlement management message epoch according to an embodiment of the present disclosure shown in FIG. 9.

FIG. 9 illustrates a method for implementing the entitlement management message epoch as an external trusted time source using the system of FIG. 1 and FIG. 2 where there are a plurality of instances of TEEs 5, 5A, etc., each TEE including a different installed CKS. FIG. 9 illustrates two instances, however, there may be more instances within the embodiment copying the steps for the second instance TEE 5A. The TEE 5 that has so far been referenced is referred to the first instance TEE and at least one more instance of TEE, a second instance TEE 5A, is added. The EMM is delivered to the TEE 5 of the CAS client device 1 and a separate EMM is delivered to each instance of TEE 5, 5A, etc. in steps S27 and S32. In certain embodiments, the EMM is transmitted through the untrusted software 6. The first and second instance TEE both receive that particular instance EMM in FIGS. 10A step S28 and 10B step S33 respectively. The second instance TEE 5A generates an updated remaining CKS lifetime value based on the CKS key for the second instance TEE 5A, the initial lifetime duration value for the CKS of the second instance TEE 5A, and the ESN value in the EMM for the second instance TEE 5A. If an initial transmission of the EMM, the second instance TEE 5A initializes the remaining CKS lifetime value and ESN value for the second instance TEE 5A in step S34. The second instance TEE 5A then seals the CKS, the initial lifetime duration value (optionally), updated ESN value, and updated CKS lifetime value as unit information in step S35. During this time, the first instance TEE also runs through the same process with the values for the first instance TEE in steps S28-S30. FIG. 9 then shows both the first instance TEE and the second instance TEE 5A delivering the updated sealed unit information including ESN and remaining CKS lifetime value for each instance in step S31 and step S36.

Figure 11:
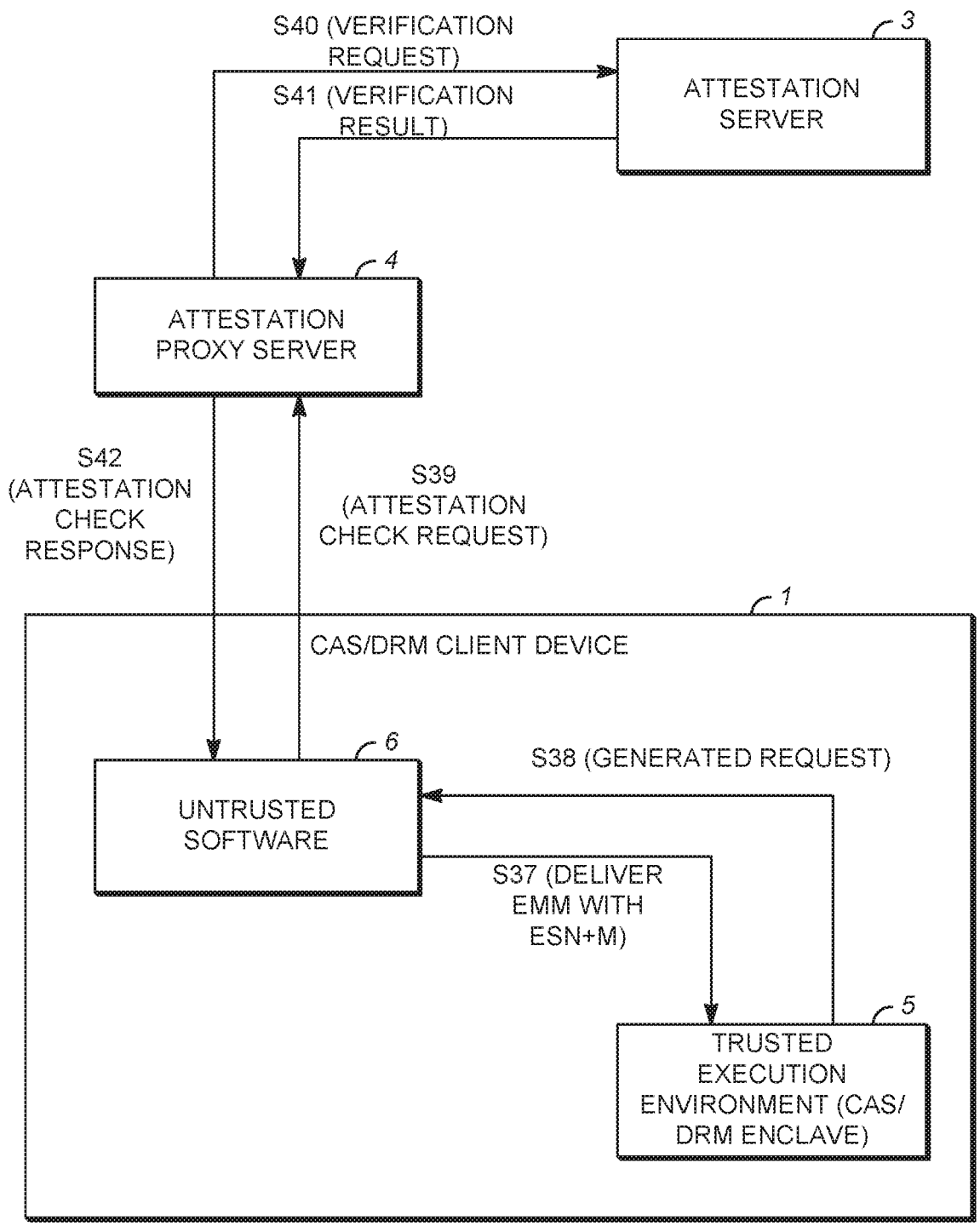
FIG. 11 illustrates a method for implementing the entitlement management message epoch as an external trusted time source and verifying with an attestation server using the system of FIG. 1 or FIG. 2 according to an embodiment of the present disclosure.
Figure 12:
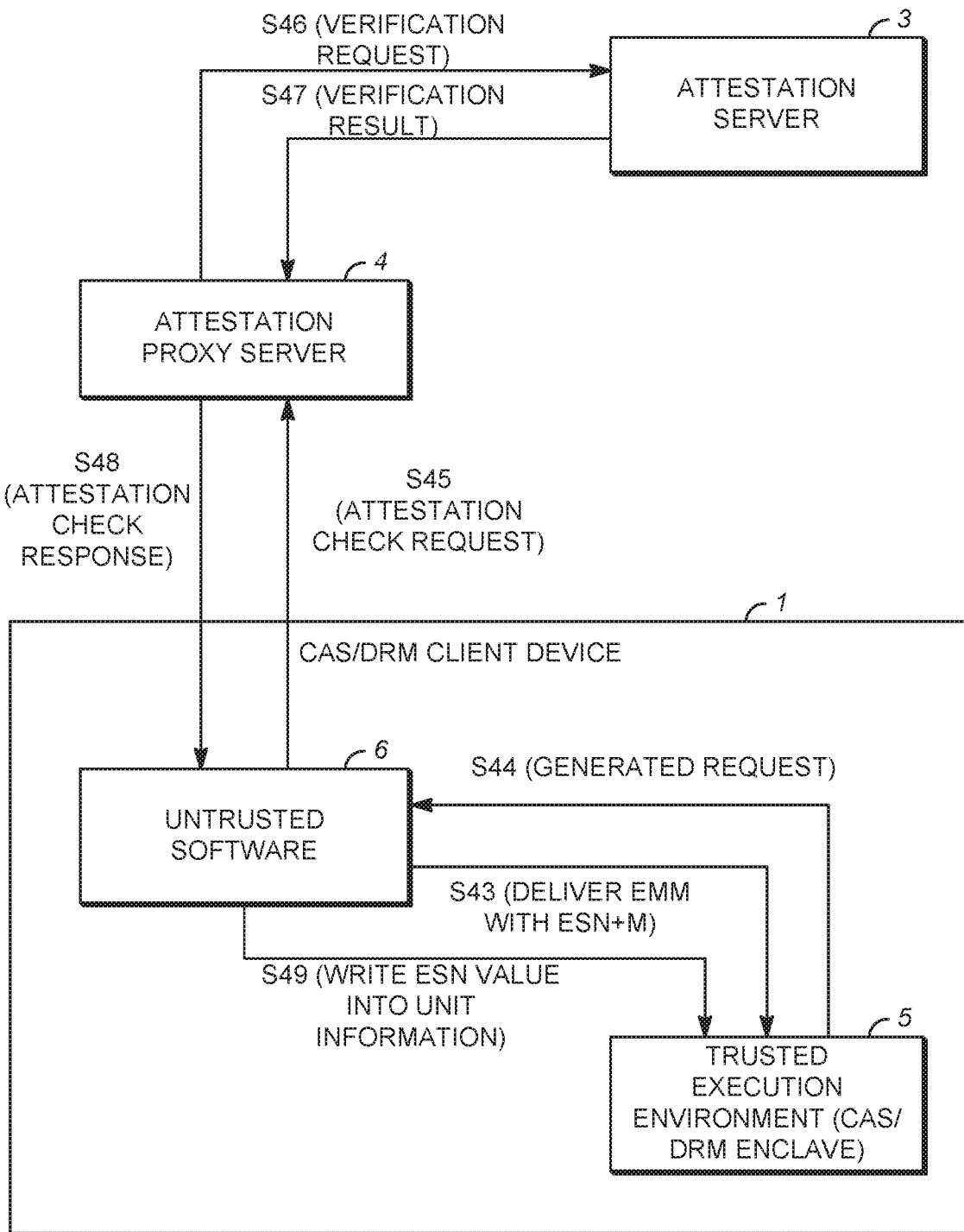
FIG. 12 illustrates a method for implementing the entitlement management message epoch as an external trusted time source and verifying with an attestation server with persistently stored ESN using the system of FIG. 1 or FIG. 2 according to another embodiment of the present disclosure.
Figure 13:
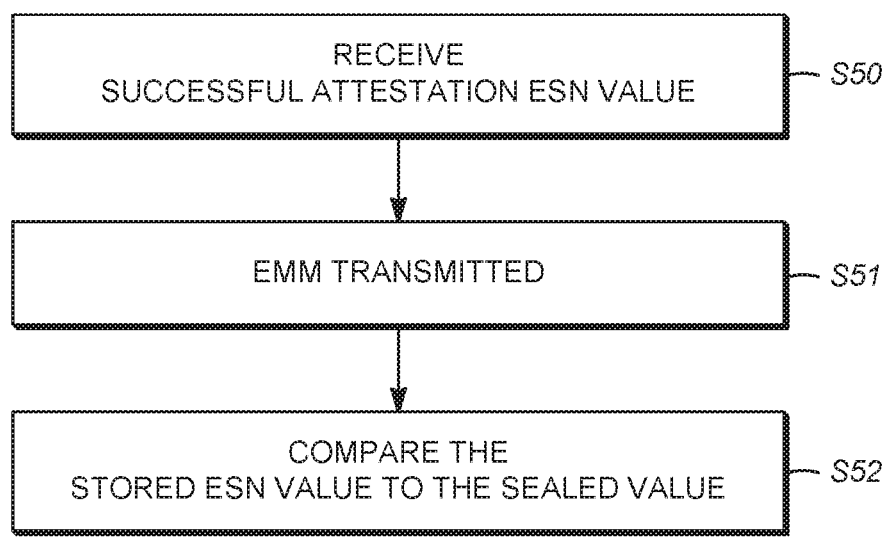
FIG. 13 illustrates a method performed by the trusted execution environment for processing the epoch from the subsequent entitlement management message according to an embodiment of the present disclosure.

To ensure additional security of the external trusted source and the CAS client device 1 itself, a periodic attestation verification can take place, illustrated in FIGS. 11 through 13. An attestation check request is transmitted from the untrusted software 6 to the attestation proxy server (APS) 4 using a second network connection 10 in steps S39 or S45. The APS 4 transmits the attestation check response from the APS 4 to the untrusted software 6 in steps S42 or S48.

Additionally, the APS 4 can further transmit the attestation check message to the attestation server 3 in steps S40 or S46 using a third network connection 9 to verify authenticity. The attestation server 3 can then transmit a result as the verification result back to the APS 4 in steps S41 or S47.

The attestation check message can be transmitted each time there is a change in the ESN value processed by the TEE 5. In this embodiment, there is a delivery of the EMM from the EMM server 2 via the untrusted software 6 to the TEE 5 in steps S37 or S43 (the EMM server 2 illustrated in FIG. 1 and FIG. 2). The TEE 5 detects an epoch transition and generates a request that is sent to the untrusted software 6 to verify software in steps S38 or S44.

In an embodiment, if the verification result is negative, the failure is logged by the CAS client device 1 and an alarm is initiated. The alarm, or failure log can be initiated after one or multiple negative verification results. Optionally, EMMs are no longer processed until a positive attestation verification result is achieved.

In certain embodiments as is shown in FIG. 12 and FIG. 13, the ESN value during the last successful verification result is persistently stored in step S49. As each EMM is processed, the ESN value from that EMM is compared to the sealed value of the ESN from the last successful verification result in steps S50-S52. In certain embodiments, an error occurs if the difference is beyond a desired threshold, i.e. if the EMM ESN value is larger than the sealed value of the ESN by the desired threshold, the EMM is deleted or ignored and the CAS client device 1 is no longer authorized for any services.

In the case that the previous ESN value is not persistently stored, the TEE's reception of the first EMM will enforce that the attestation request S38 in FIG. 11 occurs during this instance of reception of the EMM. Alternatively, the ESN value is included in the persistently saved sealed unit information. In this embodiment, the TEE of FIG. 12 compares the ESN in the received EMM with the ESN in the sealed unit information. If the new ESN in the received EMM is greater than the saved value, step S44 of FIG. 12 will occur.

FIG. 14 is a schematic diagram of an exemplary CAS client device according to an embodiment of the present disclosure. It is contemplated by the present disclosure that the CAS client device 1 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As shown in FIG. 14, the exemplary CAS client device 1 includes one or memories or memory locations including a main memory 30 and a protected memory 31 as well as an I/O interface 32, a user interface 33, a network interface 34, and one or more processors 35. The main memory 30 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy. The protected memory 31 is, for example, a processor reserved memory of dynamic random access memory (DRAM) or other reserved memory module or secure memory location maintained separate from the main memory 30.

The main memory 30 can be used to store any type of instructions associated with algorithms, processes, or operations for controlling the general functions of the CAS client device 1 including the operations of the untrusted software 7 as well as any operating system such as Linux, UNIX, Windows Server, or other customized and proprietary operating systems. The protected memory 31 on the other hand is used to store the TEE 5 and its associated parameters such as device key sets, digital keys, certificates, and the like. The I/O interface 32 can be an interface for enabling the transfer of information between CAS client device 1 and external devices such as peripherals connected to the CAS client device 1 that need special communication links for interfacing with the one or more processors 35. The I/O interface 32 can be implemented to accommodate various connections to the CAS client device 1 that include, but is not limited to, a universal serial bus (USB) connection, parallel connection, a serial connection, coaxial connection, a High-Definition Multimedia Interface (HDMI) connection, or other known connection in the art connecting to external devices.

The user interface 33 is implemented for allowing communication between a user and the CAS client device 1. The user interface 33 includes, but is not limited to, a mouse, a keyboard, a liquid crystal display (LCD), cathode ray tube (CRT), thin film transistor (TFT), light-emitting diode (LED), high definition (HD) or other similar display device with touch screen capabilities. The network interface 34 is a software and/or hardware interface implemented to establish a connection between the CAS client device 1 and the servers 2, 3, 4 in the system described in FIG. 1. It is contemplated by the present disclosure that that network interface 34 includes software and/or hardware interface circuitry for establishing communication connections with the rest of the system using both wired and wireless connections for establishing connections to, for example, a local area networks (LANs), wide area networks (WANs), metropolitan area networks (MANs) personal area networks (PANs), and wireless local area networks (WLANs), system area networks (SANs), and other similar networks.

The one or more processors 35 are used for controlling the general operations of the CAS client device 1. Each one or the one or more processors 35 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the CAS client device 1. Communication between the components of the CAS client device 1 (e.g., 30-35) are established using an internal bus 37.

FIG. 15 is a schematic diagram of an exemplary system server according to an embodiment. It is contemplated by the present disclosure that the server 40 shown in FIG. 15 is representative of the systems servers 2, 3, 4 shown in FIG. 1. It is also contemplated by the present disclosure that the server 40 includes electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As shown in FIG. 15, the exemplary server 40 includes a main memory 41, an I/O interface 42, a user interface 43, a network interface 44, and one or more processors 45. The main memory 41 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 41 can be used to store any type of instructions associated with algorithms, processes, or operations for controlling the general functions of the server 40 as well as any operating system such as Linux, UNIX, Windows Server, or other customized and proprietary operating systems. The I/O interface 42 can be an interface for enabling the transfer of information between server 40 and external devices such as peripherals connected to the server 40 that need special communication links for interfacing with the one or more processors 45. The I/O interface 42 can be implemented to accommodate various connections to the server 40 that include, but is not limited to, a universal serial bus (USB) connection, parallel connection, a serial connection, coaxial connection, a High-Definition Multimedia Interface (HDMI) connection, or other known connection in the art connecting to external devices.

The user interface 43 is implemented for allowing communication between a user and the server 40. The user interface 43 includes, but is not limited to, a mouse, a keyboard, a liquid crystal display (LCD), cathode ray tube (CRT), thin film transistor (TFT), light-emitting diode (LED), high definition (HD) or other similar display device with touch screen capabilities. The network interface 44 is a software and/or hardware interface implemented to establish a connection between the server 40, and other servers in the system as well as well as with the CAS client device 1, as described in FIG. 1. It is contemplated by the present disclosure that that network interface 44 includes software and/or hardware interface circuitry for establishing communication connections with the rest of the system using both wired and wireless connections for establishing connections to, for example, a local area networks (LANs), wide area networks (WANs), metropolitan area networks (MANs) personal area networks (PANs), and wireless local area networks (WLANs), system area networks (SANs), and other similar networks.

The one or more processors 45 are used for controlling the general operations of the server 40. Each one or the one or more processors 45 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the CAS client device 1. Communication between the components of the server 40 (e.g., 41-45) are established using an internal bus 46.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components which perform a part or all of the functions of the secure conditional access architecture.

The present disclosure includes the use of computer programs or algorithms. The programs or algorithms can be stored on a non-transitory computer-readable medium for causing a computer, such as the one or more processors, to execute the steps described in FIGS. 1-13. For example, the one or more memories stores software or algorithms with executable instructions and the one or more processors can execute a set of instructions of the software or algorithms in association with executing generating, processing provisioning requests and provisioning messages, as described in FIGS. 1-13.

The computer programs, which can also be referred to as programs, software, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner.

The subject matter of the present disclosure is provided as examples of apparatus, systems, methods, and programs for performing the features of the secure conditional access architecture. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

Various modifications to the disclosure will be readily apparent to those skilled in the art, and the generic principles defined herein may be applied to other variations without departing from the spirit or scope of the present disclosure. Throughout the present disclosure the terms "example," "examples," or "exemplary" indicate examples or instances and do not imply or require any preference for the noted examples. Thus, the present disclosure is not to be limited to the examples and designs described herein but is to be accorded the widest scope consistent with the principles and novel features disclosed.

We claim:

1. A method for implementing an external trusted time source over a network to a conditional access system (CAS) client device, the method comprising:

transmitting an entitlement management message (EMM) to a trusted execution environment (TEE) of the CAS client device from an EMM server using a first network connection, the EMM including an epoch sequence number (ESN);

generating an updated remaining client key set (CKS) lifetime value in the TEE based on an initial lifetime duration value for the CKS, and the ESN value in the EMM;

sealing the CKS, updated ESN value in the EMM, and updated remaining CKS lifetime value as unit information; and delivering the updated remaining CKS lifetime value and updated ESN value in the EMM from the TEE to untrusted software in the CAS client device, and storing the updated remaining CKS lifetime value and updated ESN value.

2. The method according to claim 1, wherein the EMM is transmitted to the untrusted software before sending the EMM to the TEE.

3. The method according to claim 1, wherein the initial lifetime duration value for the CKS is delivered to the CAS client device as part of the CKS.

4. The method according to claim 1, wherein the initial lifetime duration value for the CKS is a pre-configured value that is part of a CAS client implementation.

5. The method according to claim 1, further comprising the step of initializing the remaining CKS lifetime value and ESN value when the first EMM is transmitted to the TEE after installing a CKS.

6. The method according to claim 1, wherein the TEE does not accept sealed unit information after a reboot unless it also contains an EMM related remaining CKS lifetime value and ESN value.

7. The method according to claim 1, wherein the EMM server moves to a next epoch transition over the course of a pre-defined epoch period, wherein the ESN in the EMM is incremented by M in value.

8. The method according to claim 7, further comprises updating the sealed unit information with the new incremented value for the ESN by M in value and decrementing the remaining CKS lifetime value by N in value.

9. The method according to claim 8, wherein when the remaining CKS lifetime value is at a lower bound when EMM is received by the TEE, the updated remaining CKS lifetime value in the TEE, and the ESN value in the EMM is not generated and the EMM is deleted or ignored.

10. The method according to claim 8, wherein the remaining CKS lifetime value is at a lower bound after the decrementing, the EMM is deleted or ignored and sealed unit information is sent with a remaining CKS lifetime value at the lower bound.

11. The method according to claim 7, wherein there is a time lapse between the last ESN received and the current ESN received from the EMM server so that the ESN is incremented X in value, wherein X is a multiple of M, further comprising decrementing the remaining CKS lifetime by Y, wherein the same value of the multiple of M for X, is the multiple of N for Y.

12. The method according to claim 11, wherein the remaining CKS lifetime value is at a lower bound after the decrementing, the EMM is deleted or ignored and sealed unit information is sent with a remaining CKS lifetime value at the lower bound.

13. The method according to claim 1, wherein the TEE is a first instance TEE, the method further comprising one or more instances of TEE including at least a second instance TEE, each instance of TEE comprising a different installed CKS, wherein the EMM server transmits a separate EMM with a separate ESN to each of the one or more instances of TEE, each of the one or more instances of TEE generates an updated remaining CKS lifetime value based on the initial lifetime duration value for the CKS of each of the one or more instances of TEE, and the ESN value in the EMM for each of the one or more instances of TEE; sealing the CKS, updated ESN value in the EMM, and updated remaining CKS lifetime value as unit information in each of the one or more instances of TEE; and delivering the updated remaining CKS lifetime value and updated ESN value in the EMM from each of the one or more instances of TEE to untrusted software in the CAS client device, and storing the updated remaining CKS lifetime value and updated ESN value for each of the one or more instances of TEE.

14. The method according to claim 1, further comprising forming an attestation check message, and transmitting the attestation check message from the CAS client device to an attestation proxy server (APS) using a second network connection; and transmitting the attestation check response from the APS to the untrusted software using the second network connection, and sending the attestation check response from the untrusted software to the TEE.

15. The method according to claim 14, further comprising transmitting the attestation check message to an attestation server using a third network connection to verify authenticity, and transmitting from the attestation server a result as the verification result to the APS.

16. The method according to claim 15, wherein the attestation check message is transmitted each time there is a change in the ESN value in the sealed unit information in the TEE.

17. The method according to claim 16, wherein the verification result is negative, the failure is logged by the client device and an alarm is initiated.

18. The method according to claim 16, wherein the ESN value during the last successful verification result is persistently stored, and with each EMM that is transmitted, the EMM ESN value is compared to the sealed value of the ESN from the last successful verification result.

19. A non-transitory computer-readable recording medium in each of a client device and an entitlement management message (EMM) server for implementing an external trusted time source over a network to a conditional access system (CAS) client device, each non-transitory computer-readable recording medium storing one or more programs which when executed by a respective processor performs a method comprising:

transmitting an EMM to a trusted execution environment (TEE) of the CAS client device from the EMM server using a first network connection, the EMM including an epoch sequence number (ESN);

generating an updated remaining client key set (CKS) lifetime value in the TEE based on an initial lifetime duration value for the CKS, and the ESN value in the EMM;

sealing the CKS, updated ESN value in the EMM, and updated remaining CKS lifetime value as unit information; and delivering the updated remaining CKS lifetime value and updated ESN value in the EMM from the TEE to untrusted software in the CAS client device, and storing the updated remaining CKS lifetime value and updated ESN value.

20. An apparatus for implementing an external trusted time source over a network to a conditional access system (CAS) client device, the apparatus comprising:

a non-transitory memory configured to store one or more programs, untrusted software, and a trusted execution environment (TEE);

a hardware processor configured to execute the one or more programs to perform operations of the untrusted software and the TEE; and a network interface configured to establish communication with a network using a network connection, wherein when the one or more programs are executed by the hardware processor:

the TEE of the CAS client device receives an entitlement management message (EMM) from an EMM server using the network connection, wherein the EMM includes an epoch sequence number (ESN), the TEE generates an updated remaining client key set (CKS) lifetime value based on an initial lifetime duration value for the CKS, and the ESN value in the EMM, the TEE seals the CKS, updated ESN value in the EMM, and updated remaining CKS lifetime value as unit information, and the TEE delivers the updated remaining CKS lifetime value and ESN to untrusted software in the CAS client server, and stores the updated remaining CKS lifetime value.

\* \* \* \* \*

UNITED STATES PATENT AND TRADEMARK OFFICE
CERTIFICATE OF CORRECTION

PATENT NO. : 11,025,424 B2
APPLICATION NO. : 16/396601
DATED : June 1, 2021
INVENTOR(S) : Alexander Medvinsky and Douglas M. Petty It is certified that error appears in the above-identified patent and that said Letters Patent is hereby corrected as shown below:

In the Specification

Column 6, Line 31: Replace "step S" with --step 5--

Signed and Sealed this
Twenty-ninth Day of August, 2023

Katherine Kelly Vidal
*Director of the United States Patent and Trademark Office*